United States Patent
Marziani

(10) Patent No.: US 8,678,439 B2
(45) Date of Patent: Mar. 25, 2014

(54) SEAT BELT CONNECTION DEVICE FOR A VEHICLE

(71) Applicant: Fiat Group Automobiles S.p.A., Turin (IT)

(72) Inventor: Sergio Marziani, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 13/889,057

(22) Filed: May 7, 2013

(65) Prior Publication Data

US 2013/0313814 A1    Nov. 28, 2013

(30) Foreign Application Priority Data

May 8, 2012 (EP) .................................. 12425086

(51) Int. Cl.
*B60R 22/28* (2006.01)

(52) U.S. Cl.
USPC ........ 280/805; 280/801.1; 280/808; 297/471; 297/472

(58) Field of Classification Search
USPC ............... 280/801.1, 805, 808; 297/471, 472, 297/478, 483, 486
See application file for complete search history.

(56) References Cited

U.S. PATENT DOCUMENTS

| | | | | |
|---|---|---|---|---|
| 5,529,344 A * | 6/1996 | Yasui et al. | .................... | 280/808 |
| 5,791,687 A | 8/1998 | Gotou et al. | | |
| 5,863,071 A * | 1/1999 | Li-Calso | .................... | 280/801.1 |
| 6,478,334 B1 | 11/2002 | Desmarais et al. | | |
| 6,874,818 B2 * | 4/2005 | Crimmins et al. | ............ | 280/805 |
| 7,810,843 B2 * | 10/2010 | Gray | ............................ | 280/808 |
| 2004/0253048 A1 | 12/2004 | Schulz | | |
| 2005/0012319 A1 * | 1/2005 | Schulz | .......................... | 280/805 |
| 2005/0077718 A1 | 4/2005 | Desmarais et al. | | |

FOREIGN PATENT DOCUMENTS

DE    197 31 806 A1    1/1999

\* cited by examiner

*Primary Examiner* — Toan To
*Assistant Examiner* — Darlene P Condra
(74) *Attorney, Agent, or Firm* — Dickstein Shapiro LLP

(57) ABSTRACT

A seat belt connection device for a vehicle has a ring through which the seat belt can slide; the ring is supported by a member fixed to the front end of a stem, which extends along a substantially horizontal axis and is guided by a sleeve fixed in a hole of the pillar; the device also has a deformable structure that is fixed to the pillar and to one of the ends of the stem and is plastically deformable so as to allow the stem to retract in the event of an axial impact.

10 Claims, 3 Drawing Sheets

SEAT BELT CONNECTION DEVICE FOR A VEHICLE

The present invention relates to a seat belt connection device for a vehicle.

BACKGROUND OF THE INVENTION

As is known, seat belts in vehicles slide through D-rings that are connected to a fixed structure of the vehicle at a height above that of the shoulders of a user who must wear the seat belt.

To limit injury to the user in the event of an accident, it is advisable to provide expedients that enable the D-ring to cushion possible impact by the user's head.

To this end, U.S. Pat. No. 5,791,687 teaches how to connect the D-ring to a pillar by means of two brackets that plastically deform when the D-ring is pushed towards the pillar by a relatively high impact force. In particular, the D-ring is connected in a vertically sliding manner to an adjustment track, which is connected in turn to the brackets by respective bolts, spaced vertically apart from each other. The rear ends of the bolts pass through a front surface of the pillar and are fixed to the brackets, which are consequently housed inside the pillar.

A solution such as that described in U.S. Pat. No. 5,791,687 is not very satisfactory because the anchorage zone between the brackets and the rear ends of the bolts is relatively far from the D-ring, and so the load exerted by the seat belt during normal use could permanently deform some components. In fact, the tension exerted by the seat belt is directed substantially downwards and is transferred on the pillar through the two brackets, but the lever arm of the force with respect to the rear ends of bolts is relatively long, without any device that opposes flexure.

In addition, each bracket has an intermediate zone placed in contact against the front face of the pillar and is relatively far from the anchorage points to the front surface: therefore, in normal operating conditions, the above-stated flexure causes elastic deformation of the brackets, which vibrate against the front surface and consequently cause noise in the driver/passenger compartment.

Furthermore, it is relatively difficult to mount the system described in U.S. Pat. No. 5,791,687 in the vehicle, especially with regard to fastening the rear ends of the bolts to the brackets inside the pillar.

SUMMARY OF THE INVENTION

The object of the present invention is that of providing a seat belt connection device for a vehicle that enables the above-described drawbacks to be resolved in a simple and inexpensive manner.

According to the present invention, a seat belt connection device is produced, as defined in claim 1.

BRIEF DESCRIPTION OF THE DRAWINGS

For a better understanding of the present invention, a preferred embodiment will now be described, purely by way of non-limitative example, with reference to the attached drawings, where.

DETAILED DESCRIPTION OF THE INVENTION

Figure 3:
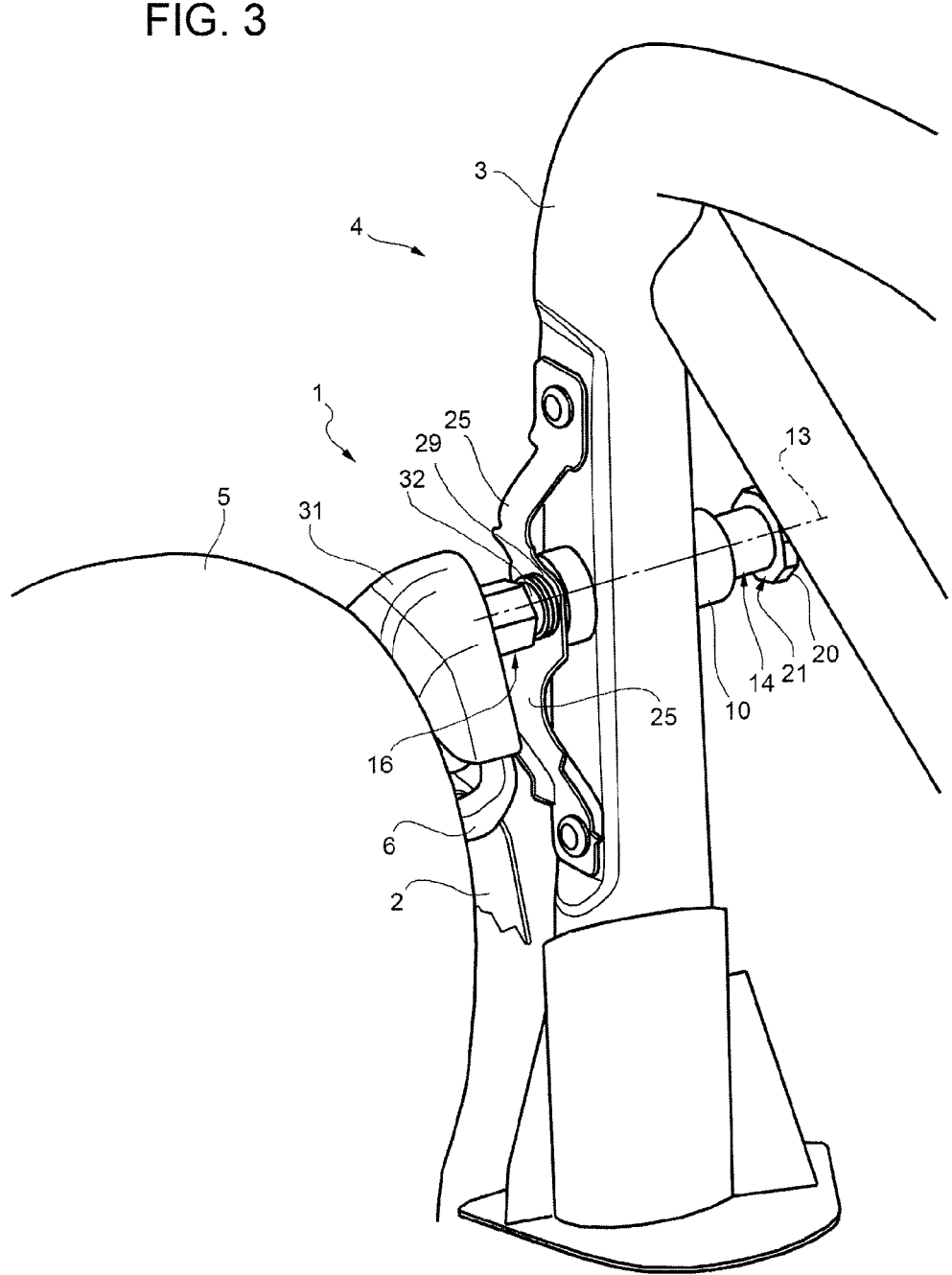
FIG. 3 illustrates the device of FIG. 1 during impact in the event of the vehicle having an accident.

In FIG. 3, reference numeral 1 indicates a connection device for connecting a seat belt 2 (partially shown) to a pillar 3 of a vehicle 4 (partially shown).

The device 1 is placed at a height above the shoulder of a user 5 (partially shown) who is sitting on a seat (not shown) in the driver/passenger compartment of the vehicle 4. The device 1 comprises a ring 6, usually called a "D-ring", through which the seat belt 2 can freely slide and change direction, so that the seat belt 2 can be pulled downwards over the torso of the user 5 and be fastened to a buckle device (not shown) placed at the side of the seat. Therefore, the ring 6 supports the seat belt and the tension of the seat belt is transferred to the pillar 3 through the device 1, as will be described in greater detail hereinafter.

In the particular example shown, the pillar 3 constitutes part of a roll bar placed between the driver/passenger compartment and a rear engine compartment.

Figure 1:
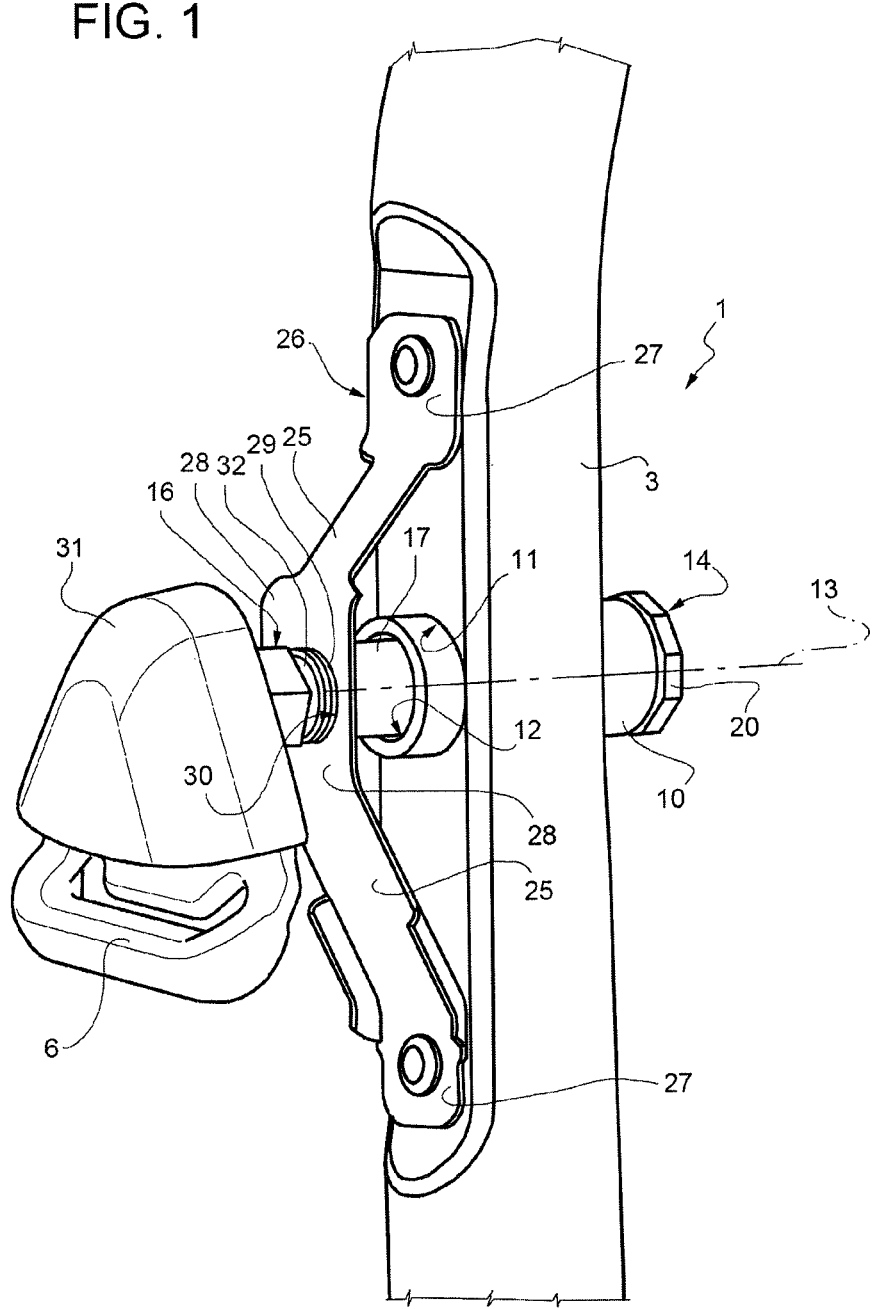
FIG. 1 is a perspective that shows a preferred embodiment of the seat belt connection device for a vehicle according to the present invention.
Figure 2:
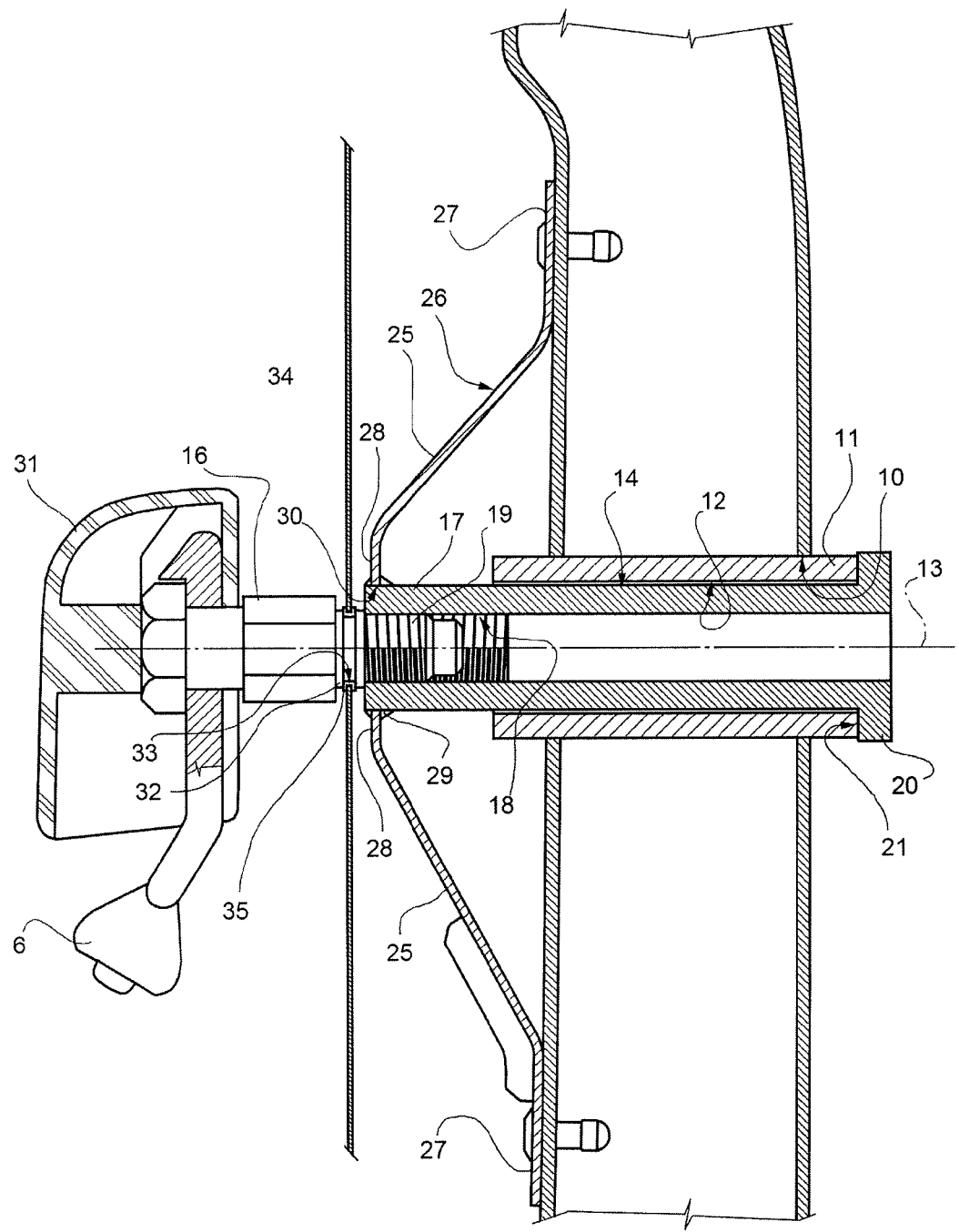
FIG. 2 shows the device of FIG. 1 in cross-section, along a vertical longitudinal section plane.

With reference to FIGS. 1 and 2, the device 1 comprises a sleeve 10, which engages a hole 11 in the pillar 3, is fixed to the pillar 3, by welding for example, and is preferably long enough to protrude at the front and the back of the outer surface of the pillar 3. The sleeve 10 defines a guide seat 12, which extends along a substantially horizontal axis 13 and is engaged by a stem 14 in an axially sliding manner.

The device 1 also comprises a support member 16, which supports the ring 6, in a known manner and not described in detail, and is fixed to a front end portion 17 of the stem 14. The front end portion 17 is external to the guide seat 12 under rest conditions and, in particular, has a threaded axial hole 18, into which a threaded rod 19 of the support member 16 is screwed.

The stem 14 has a rear end 20, which is arranged behind the sleeve 10, i.e. externally to the guide seat 12, and radially projects towards the outside to define an axial shoulder 21 facing the sleeve 10. Under normal conditions of seat belt use and under rest conditions, the axial shoulder 21 abuts against the sleeve 10, to define an axial end stop and to prevent disengagement of the stem 14 from the guide seat 12.

The device 1 also comprises two laminar portions 25, which are arranged above and below the stem 14, each one having one end 27 fixed to the pillar 3, in a position spaced vertically apart from the sleeve 10, and the other end 28 fixed to the front end portion 17, in a zone 29 that is axially spaced apart from the sleeve 10 under rest conditions. In this way, each one of the laminar portions 25 form two curves of opposite concavity, passing from end 27 to the stem 14. For example, the fastening between the pillar 3 and ends 27 is accomplished by rivets, screws or clips, and the fastening between the ends 28 and zone 29 is accomplished by a weld. Preferably, the laminar portions 25, taken together, form a bracket 26 made as a single piece and having an intermediate seat 30 engaged by the front end portion 17.

As can be seen in FIG. 3, in the event of an accident, the head of the user 5 can strike the ring 6 or a capping 31 that covers the support member 16, with a component of the impact directed along axis 13: at least the intermediate parts of the laminar portions 25 plastically deform during impact and their deformation allows the stem 14 to axially retract into the guide seat 12, i.e. into the pillar 3, and consequently allows the ring 6 to retract towards the sleeve 10. At the same time, the plastic deformation dissipates the impact energy in order to limit head injury.

As shown in FIG. 2, the support member 16 comprises a collar 32 extending through an opening 33 of a fixed wall 34, which is interposed between the driver/passenger compartment and the pillar 3, so as to hide the stem 14 and the bracket 26. In the particular described example, the wall 34 is placed in front of the roll bar and defines a firewall element to insulate the driver/passenger compartment from the engine compartment. Preferably, the collar 32 is connected to the edge of the opening 33 in a sealed manner by a grummet 35 fitted on the collar 32.

When the seat belt is tensioned, the pull exerted on the ring 6 is transferred to the pillar 3 through the stem 14 and the sleeve 10, without effectively involving the laminar portions 25, and therefore the device 1 proves to be relatively rigid with regard to flexure and is able to maintain the position of the ring 6 and the tension of the seat belt stable under normal operating conditions, without deformation of the various components.

In particular, the increase in flexional resistance also makes the position of the stem 14 more stable, which is why contact vibration between the stem 14 and the pillar 3 is reduced, around the shoulder 21, and therefore noise is reduced with respect to known solutions.

On the other hand, as mentioned above, in the event of direct impact along axis 13, the device 1 is deformable and possesses a high capacity of impact energy absorption thanks to the plastic deformation of the laminar portions 25. In particular, the axial distance between zone 29 and the sleeve 10 defines the maximum distance that the stem 14 can travel during impact and the plastic deformation of the laminar portions 25.

In the vehicle assembly stage, the bracket 26 and the sleeve 10 are already pre-mounted in fixed positions on the pillar 3. In particular, the sleeve 10 is inserted in the hole 11 and welded to the pillar 3 before the bracket 26 is riveted on.

The stem 14 is inserted in the guide seat 12, from the rear side, until the front end portion 17 fits in the seat 30 and the axial shoulder 21 makes contact against the sleeve 10. At this point, the front end portion 17 is butt welded onto the bracket 26. Lastly, the support member 16 is fixed to the stem 14, also connecting the wall 34 to the collar 32.

The operation of fastening the stem 14 to the bracket 26 is thus carried out from the front side, i.e. in the driver/passenger compartment, without having to access the area behind the pillar 3, and therefore it is relatively simply to perform. Moreover, the fastening is accomplished by welding, which enables avoiding the use of additional clamping components between the bracket 26 and the end portion 17 of the stem 14.

Furthermore, when screwing in the threaded rod 19, it is not necessary to hold the front end portion 17 steady with other tools, as the stem 14 is already angularly constrained to the pillar 3 by the bracket 26.

Finally, from the foregoing, it is evident that modifications and variations can be applied to the device 1 described and illustrated herein without leaving the scope of protection of the present invention, as defined in the appended claims.

In particular, the bracket 26 could have a different shape from that shown, or could be replaced by one more plastically deformable elements having a different structure from the laminar one, and/or could be placed behind the pillar 3 and thus be fixed to the rear end 20.

Furthermore, instead of constituting part of a roll bar, the pillar 3 could constitute part of a normal vehicle frame.

The invention claimed is:

1. A seat belt connection device for a vehicle, comprising:
   a ring (6), through which the seat belt (2) can slide;
   support means (16) that support said ring (6);
   a stem (14), which extends along a substantially horizontal axis (13) through a hole (11) made in a pillar (3) of said vehicle and comprises a first end portion (17) connected to said support means (16) and a second end portion (20) axially opposite with respect to said first end portion (17);
   a deformable structure (26), which comprises:
      a) a first connection portion (28) fixed to one (17) of said first and second end portions and a second connection portion (27) fixed to said pillar (3),
      b) an intermediate portion, plastically deformable in the event of an impact against the device, so as to let said stem (14) retract into said pillar (3);
   characterized by further comprising a sleeve (10), which engages said hole (11), is fixed to said pillar (3) and defines a guide seat (12) engaged in an axially sliding manner by said stem (14).

2. A device according to claim 1, characterized in that said deformable structure (26) is arranged between said pillar (3) and said support means (16), said first connection portion (28) being fixed to said first end portion (17) in a zone (29) axially spaced apart from said pillar (3).

3. The device according to claim 1, characterized in that said first connection portion (28) is fixed to said stem (14) by welding.

4. The device according to claim 1, characterized in that said second end portion (20) is arranged outside of said sleeve (10) and defines a shoulder (21) axially facing said sleeve (10).

5. The device according to claim 1, characterized in that said sleeve (10) axially protrudes at both ends with respect to said hole (11).

6. The device according to claim 1, characterized in that said deformable structure comprises two laminar portions (25) arranged on opposite sides of said stem (14).

7. The device according to claim 6, characterized in that said laminar portions (25) constitute part of a bracket (26) made in single piece and having a seat engaged by said stem (14).

8. The device according to claim 1, characterized in that said support means (16) comprise a threaded rod (19) screwed into said first end portion (17).

9. A vehicle comprising a seat belt connection device made according to claim 1.

10. The vehicle according to claim 9, characterized by comprising a driver/passenger compartment and a wall (34) interposed between said pillar (3) and said driver/passenger compartment, said support means (16) extending through an opening (33) of said wall (34) and being connected to the edge of said opening (33) by a grummet (35).

* * * * *